(12) United States Patent
Li et al.

(10) Patent No.: US 11,657,550 B2
(45) Date of Patent: May 23, 2023

(54) METHOD FOR GENERATING ELECTRONIC REPORT, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Yanyan Li, Beijing (CN); Airong Jiang, Beijing (CN); Dejing Dou, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/450,650

(22) Filed: Oct. 12, 2021

(65) Prior Publication Data
US 2022/0028137 A1    Jan. 27, 2022

(30) Foreign Application Priority Data
Dec. 3, 2020 (CN) .......................... 202011396020.7

(51) Int. Cl.
   *G06T 11/20* (2006.01)
   *G06F 16/22* (2019.01)
(52) U.S. Cl.
   CPC ........ *G06T 11/206* (2013.01); *G06F 16/2246* (2019.01)

(58) Field of Classification Search
   CPC .............. G06T 11/206; G06F 16/2246; G06F 16/9027; G06F 16/248; G06F 16/26; G06Q 10/0637
   See application file for complete search history.

(56) References Cited

U.S. PATENT DOCUMENTS

| 2016/0267171 A1* | 9/2016 | Wang ...................... G06F 16/26 |
| 2022/0139010 A1* | 5/2022 | Du ...................... G06F 16/9024 |
| | | 345/440.2 |

FOREIGN PATENT DOCUMENTS

| CN | 110176076 A | * | 8/2019 | |
| CN | 111327943 A | * | 6/2020 | ......... H04N 21/4394 |
| CN | 111737539 A | * | 10/2020 | |
| JP | 2016042308 A | * | 3/2016 | |

* cited by examiner

*Primary Examiner* — Jeffery A Brier
(74) *Attorney, Agent, or Firm* — Morrison & Foerster LLP

(57) ABSTRACT

A method for generating an electronic report, an electronic device and a storage medium, related to the field of large data and the field of artificial intelligence, are disclosed. The method for generating an electronic report includes: establishing a template tree comprising a plurality of branches, wherein the branches comprise at least one intermediate node and bottom layer nodes comprising identification information; and calling, for respective branches, data groups corresponding to the identification information of the bottom layer nodes from a database, respectively, and displaying the called data groups at positions corresponding to the bottom layer nodes in an electronic report. Labor consumption may be reduced, and advantages of low cost, high efficiency, automation and routinization may be achieved.

18 Claims, 7 Drawing Sheets

```
                                              ┌─ S10
┌─────────────────────────────────────────────┐
│ establishing a template tree including a   │
│ plurality of branches, wherein the branches │
│ include at least one intermediate node and  │
│ bottom layer nodes including                │
│ identification information                  │
└─────────────────────────────────────────────┘
                       │
                       │              ┌─ S20
┌─────────────────────────────────────────────┐
│ calling, for respective branches, data      │
│ groups corresponding to the identification  │
│ information of the bottom layer nodes       │
│ from a database, respectively, and          │
│ displaying the called data groups at        │
│ positions corresponding to the bottom layer │
│ nodes in an electronic report               │
└─────────────────────────────────────────────┘
```

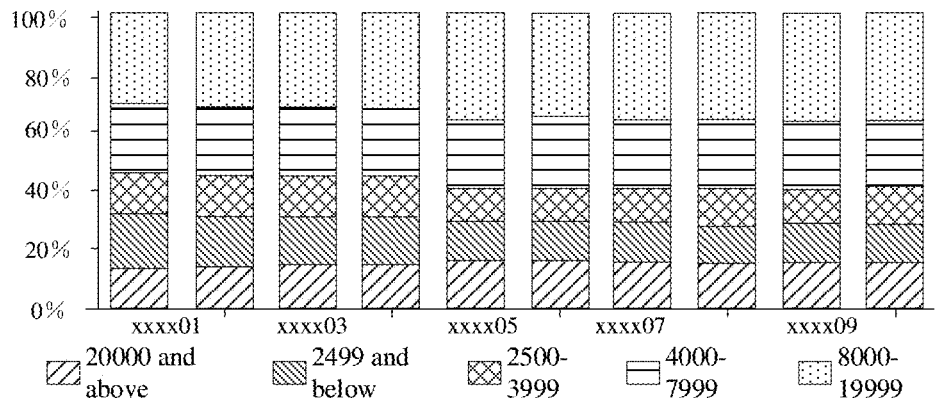

change of the proportion of the resident population income level of city A

The histogram of the above figure shows that the resident population income level remains relatively stable over the past period of time [3], with a slight decrease in the population share in a range of "8000-19999 RMB"; the proportion of population having income in a range of "4000-7999" decreased from 22.88% in June XXXX (year) to 21.68% in October XXXX (year); the proportion of population of low income (income level of 2499 and below) in October XXXX (year) in city A was 6.66% lower than that in June XXXX (year).

FIG. 2

```
1 urban overall population status 1.1 population inflow and outflow analysis 1.1.1 population inflow analysis population outflow analysis 1.2 population age variation distribution 1.2.1 resident population age variation distribution 1.2.2 floating population age variation distribution
```

METHOD FOR GENERATING ELECTRONIC REPORT, ELECTRONIC DEVICE, AND STORAGE MEDIUM

CROSS-REFERENCE TO RELATED APPLICATION

This application claims priority to Chinese patent application No. 202011396020.7, filed on Dec. 3, 2020, which is hereby incorporated by reference in its entirety.

TECHNICAL FIELD

The present disclosure relates to the technical field of computers, in particular to the field of large data and the field of artificial intelligence.

BACKGROUND

A city is a carrier of human life. With the development of large data and artificial intelligence, quantitative analysis for the city becomes an important part of an intelligent city. City quantitative analysis can evaluate roads, humanities, residence, education and other aspects of a city by means of large data, to assist urban managers to make a decision. It is therefore important to generate electronic reports of cities or regions in batches, on a large scale, automatically and routinely.

SUMMARY

The present disclosure provides a method and an apparatus for generating an electronic report, an electronic device and a storage medium.

According to an aspect of the present disclosure, there is provided a method for generating an electronic report, including:
  establishing a template tree including a plurality of branches, wherein the branches include at least one intermediate node and bottom layer nodes including identification information; and
  calling, for respective branches, data groups corresponding to the identification information of the bottom layer nodes from a database, respectively, and displaying the called data groups at positions corresponding to the bottom layer nodes in an electronic report.

According to another aspect of the present disclosure, there is provided a device of generating an electronic report, including:
  a template tree establishment module configured for establishing a template tree including a plurality of branches, wherein the branches include at least one intermediate node and bottom layer nodes including identification information; and
  a display module configured for calling, for respective branches, data groups corresponding to the identification information of the bottom layer nodes from a database, respectively, and displaying the called data groups at positions corresponding to the bottom layer nodes in an electronic report.

According to another aspect of the present disclosure, there is provided an electronic device, including:
  at least one processor; and
  a memory communicatively connected to the at least one processor; wherein,
  the memory stores instructions executable by the at least one processor, the instructions being executed by the at least one processor to enable the at least one processor to perform the abovementioned method.

According to another aspect of the present disclosure, there is provided a non-transitory computer-readable storage medium storing computer instructions for enabling a computer to execute the abovementioned method.

According to another aspect of the present disclosure, there is provided a computer program product including computer instructions which, when executed by a processor, cause the processor to execute the abovementioned method.

It should be understood that the content described in this section is intended to neither identify the key or important features of the embodiments of the present disclosure, nor limit the scope of the present disclosure. Other features of the present disclosure will be readily understood through the following description.

BRIEF DESCRIPTION OF THE DRAWINGS

The drawings are included to provide a better understanding of the present disclosure and are not to be construed as limiting the present disclosure. Wherein:

FIG. 2 is a schematic diagram of a data chart generated according to a chart generation rule in an embodiment;

DETAILED DESCRIPTION

Exemplary embodiments of the present disclosure are described below in combination with the accompanying drawings, including various details of the embodiments of the present disclosure to facilitate the understanding, and they should be considered as merely exemplary. Thus, it should be realized by those of ordinary skill in the art that various changes and modifications can be made to the embodiments described here without departing from the scope and spirit of the present disclosure. Also, for the sake of clarity and conciseness, the contents of well-known functions and structures are omitted in the following description.

Figure 1:
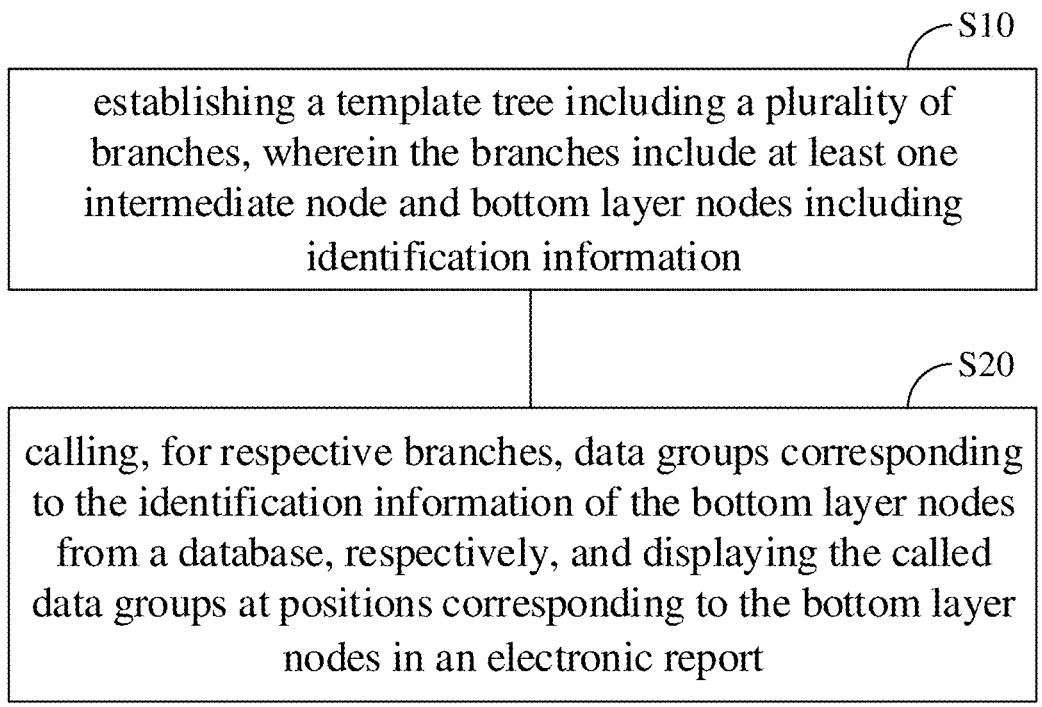
FIG. 1 is a schematic diagram of a method for generating an electronic report according to an embodiment of the present disclosure.

FIG. 1 is a schematic diagram of a method for generating an electronic report in an embodiment of the present disclosure. As shown in FIG. 1, the method for generating an electronic report may include:

S10, establishing a template tree including a plurality of branches, wherein the branches include at least one intermediate node and bottom layer nodes including identification information; and S20, calling, for respective branches, data groups corresponding to the identification information of the bottom layer nodes from a database, respectively, and displaying the called data groups at positions corresponding to the bottom layer nodes in an electronic report.

According to the technical scheme of the present disclosure, manual data collection and manual editing are not needed, labor consumption is reduced, and it has the advantages of low cost, wide coverage, high efficiency, automation and routinization.

The template tree can be used as the basis of the directory of the electronic report, so that a user can conveniently view the directory information of the electronic report through the template tree.

A branch may include an intermediate node and a bottom layer node, illustratively, the number of the intermediate node is at least one. The bottom layer node may be an end-most node of a branch, and the intermediate node may be a node located at an upper layer of the bottom layer node.

Illustratively, the database can adopt large data which are automatically collected and generated by a network system, no manual collection is needed, and labor consumption can be reduced.

The bottom layer node may include identification information, and there are data groups corresponding to the identification information in the database.

Illustratively, the displaying the called data groups at positions corresponding to the bottom layer nodes in the electronic report may be understood as displaying the called data groups in contents corresponding to the bottom layer nodes in the electronic report.

According to the method for generating an electronic report according to the embodiment of the present disclosure, the template tree is adopted to generate the electronic report, the manual editing of producing the report is not relied on, the generated electronic report is visual and convenient for a user to view, and in the process of generating the electronic report, the manual mode is not relied on for data collection, and the electronic report is directly generated by a computer, so that the labor consumption is reduced, and the method has the advantages of low cost, wide coverage, high efficiency, automation and routinization. The method may be applied to the field of artificial intelligence, such as generating artificial intelligence analysis reports, and may also be applied to the field of large data, for analyzing large data and then automatically generating an electronic report.

In an embodiment, the identification information may include at least one of an attribute, a region identification, and time information.

Illustratively, the attribute may be the type of data group called, for example, the attribute may be resident population income level, and then a computer may call a corresponding data group from data related to "resident population income level". The region identification may include a region ID, for example, a region identification of city A is 123456, and then the computer may call a corresponding data group from relevant data with the region identification of "123456". The time information may include at least one of a day, a month, a quarter, and a year. The computer will call a corresponding data group from relevant data at the corresponding time.

In an embodiment, in a large data-based chart, the identification information may include a region identification, a region level, and time information. For example, the identification information (also called a primary key) is: (region identification, region level, date), also called (region_id, region_level, date). The region_id can represent a region ID, for example, the region ID of the city A is 123456; the region_level may represent a region level, e.g., 1, 2, 3, and 4 correspond to province, city, county, and town, respectively. Date can be day, month, quarter, or year, representing data for the corresponding day, month, quarter, year, respectively.

In an embodiment, in S20, the displaying the called data groups may include: generating data charts corresponding to the called data groups according to a chart generation rule; and displaying the data charts.

There are various ways of displaying the called data group, for example, the data in the called data group may be directly displayed to a user, or the called data group may be displayed according to a certain rule. To better display the data group to a user, the called data group may illustratively be displayed in a graphical manner, to make it more visual and intuitive to help the user better understand the result of the report.

The concrete style of the data chart may be generated according to a data chart generation rule. Illustratively, the chart generation rule may be set by a user as desired, or the user may select the chart generation rule from a preset library of chart rules. After the chart generation rule is determined, a data chart corresponding to the called data group can be generated based on the chart generation rule.

In an embodiment, the chart generation rule may include at least one of a data comparison rule, chart type information, chart style information, and a text generation rule.

FIG. 2 is a schematic diagram of a data chart generated according to a data chart generation rule in an embodiment.

Illustratively, the data comparison rule may include a quantitative comparison. For example, in FIG. 2, comparisons are made according to income levels: 20000 and above, 2499 and below, 2500~3999, 4000~7999, and 8000~49999.

Illustratively, the chart type information may include one of a histogram (which may also be called a bar chart), a bar graph, a line chart, a pie chart, and an area chart. For example, the icon type information in FIG. 2 is a histogram. The chart style information may include one of a coordinate axis and a coordinate axis definition. For example, in FIG. 2, the chart style information includes an abscissa representing time and an ordinate representing scale.

Illustratively, the text generation rule may include a manner in which a text is displayed, e.g., the text is displayed above a chart, the text is displayed below a chart, etc. For example, in FIG. 2, the text is displayed below the histogram.

Data groups of a certain area at a specified time can be uniquely determined based on the identification information, and data charts corresponding to the data groups for display to a user can be generated based on the data in the data group and the chart generation rule. Therefore, the displaying the called data groups may include: displaying data charts corresponding to the called data groups. The result is more visually displayed to the user through the data chart.

In an embodiment, the called data groups may include first text information, a plurality of data items, and categories of respective data items.

The first text information, the plurality of data items and the categories of the respective data items are all displayed in the data chart, for example, the text information under "change of the proportion of the resident population income level of city A" in FIG. 2 may be the first text information.

The plurality of data items may include a data item corresponding to xxxx01, a data item corresponding to xxxx02, . . . , and data items corresponding to xxxx09 and xxxx10. The categories of data items may be xxxx01 (January, xxxx (year)), xxxx03 (March, xxxx (year)), . . . , xxxx09 (September, xxxx(year)), etc.

In an embodiment, the method for generating an electronic report may further include: generating data charts corresponding to respective data groups in the database according to a chart generation rule; and calling, for respective branches, data charts of the data groups corresponding to the identification information of the bottom layer nodes from the database, respectively, and displaying the called data charts at the positions corresponding to the bottom layer nodes in the electronic report.

Based on the data in the data group and the chart generation rule, a data chart corresponding to the data group for display to a user can be generated.

A data group or its corresponding data chart may be represented by chart_i, and the database may include a plurality of data charts corresponding to respective data groups, thus the database may also be referred to as a data chart set C, the data chart set C={chart_0, chart_1, . . . , chart_n}, where n is a positive integer.

The database may be a collection of a plurality of data charts, and each of the data charts may be generated according to a data group and a data chart generation rule, thus each data group and a data chart corresponding to each data group are included in the database. In a case where a data group is displayed, a data chart corresponding to the data group may be displayed directly.

Figure 3:
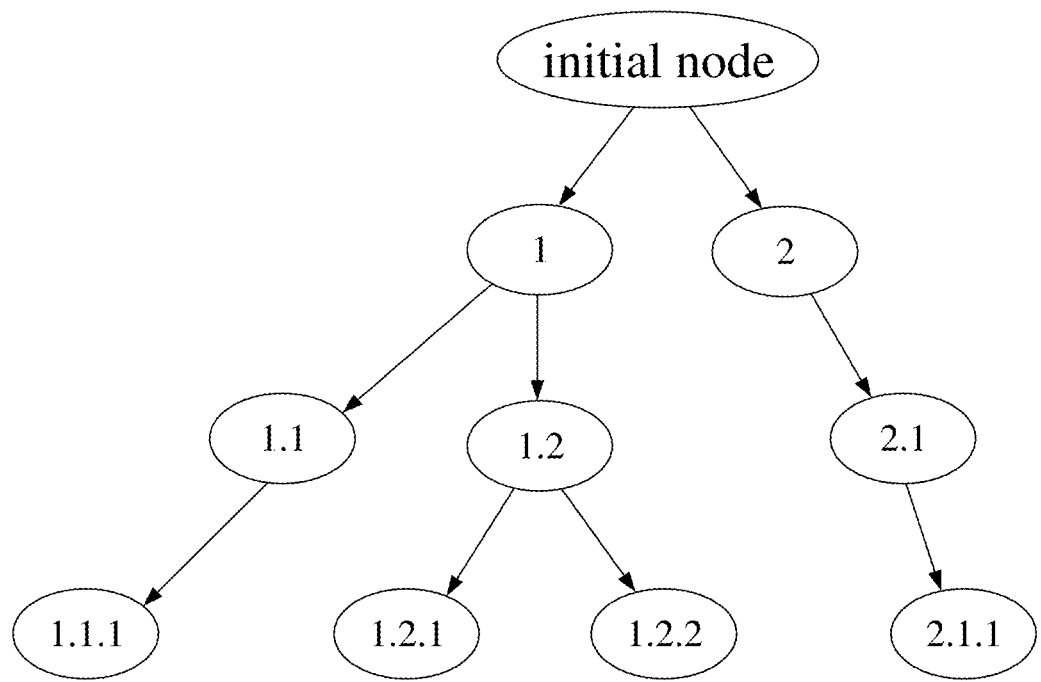
FIG. 3 is a schematic diagram of a template tree in an embodiment.

FIG. 3 is a schematic diagram of a template tree in an embodiment. The template tree may include a plurality of branches, for example, the template tree in FIG. 3 includes an initial node, a first branch, and a second branch.

Each branch may include at least one intermediate node and a bottom layer node, and in each branch, a node between the bottom layer node and the initial node may be referred to as the intermediate node. For example, in FIG. 3, the first branch includes three intermediate nodes including 1, 1.1, 1.2 and three bottom layer nodes including 1.1.1, 1.2.1, 1.2.2. The second branch includes two intermediate nodes 2, 2.1 and one bottom layer node 2.1.1. Herein, 1 and 2 are the first layer intermediate nodes of the branches respectively, and 1.1, 1.2 and 2.1 are the second layer intermediate nodes of the branches respectively.

In an embodiment, the establishing the template tree may include: receiving node information, wherein the node information includes branch numbers and node numbers of respective nodes, and the nodes comprise the intermediate node and the bottom layer nodes; establishing the respective branches, wherein nodes with a same branch number are set in a same branch; and sequentially arranging, for the respective branches, the respective nodes according to the node numbers, and connecting adjacent nodes with a connecting line.

By adopting the method of the embodiment of the present disclosure to establish the template tree, user customization can be realized, user requirements can be better met, and the established template tree conforms to the general form of the report directory, so that the report better conforms to the user requirements.

In an embodiment, a user may be provided with an interaction device through which the user may input node information. The node information may include a branch number of a branch where each node is located, for example, a first digit in nodes such as node 1, node 1.1, node 1.1.1, node 1.2, node 2, node 2.1, etc., wherein the branch number in each node is shown with an underline "_".

The node information may also include the node number of each node, for example, a number other than the branch number in the nodes such as node 1.1, node 1.1.1, node 1.2, node 2.1, etc., wherein the node number in each node is shown by a lower wavy line " ". Node numbers for node 1 and node 2 may both default to 0.

Illustratively, a user may directly input a branch number and a node number of each node in a case of inputting node information. For example, for the template tree shown in FIG. 3, the user can enter 1, 1.1, 1.1.1, 1.2, 1.2.1, 1.2.2, 2, 2.1, 2.1.1 directly.

In the template tree shown in FIG. 3, hierarchical information of each node can be obtained through the node information. For example, nodes 1, 2 are located at the first layer and are the first layer intermediate nodes of the branches where they are located, and nodes 1.1, 1.2, 2.1 are located at the second layer and are the second layer intermediate nodes of the branches where they are located.

Illustratively, the user may draw a template tree on the interactive device interface, and enter node information at the corresponding node location of the template tree. After receiving the node information, a computer analyzes the node information and sets nodes with the same branch number as the same branch. For each branch, the nodes are sequentially arranged according to the node numbers, and adjacent nodes are connected with a connecting line, as shown FIG. 3.

Illustratively, that for each branch, the nodes are sequentially arranged according to node numbers, and adjacent nodes are connected with a connecting line, may include: for each branch, determining the layer where each node is located according to the node information; arranging the nodes according to the layer where each node is located, and connecting nodes of adjacent layers with a connecting line.

For example, in FIG. 3, in the first branch, 1 is the first layer, 1.1, 1.2 are the second layer, 1.1.1, 1.2.1 and 1.2.2 are the third layer (also called the bottom layer), nodes in the first branch are sequentially arranged from top to bottom in a hierarchical incremental manner, and 1 is connected to 1.1, 1.1 is connected to 1.1.1, 1 is connected to 1.2, 1.2 is connected to 1.2.1, and 1.2 is connected to 1.2.2, with connecting lines.

In the template tree shown in FIG. 3, the identification information of the bottom layer node 1.1.1 corresponds to two data charts chart_1_0 and chart_1_1, the identification information of the bottom layer node 1.2.1 corresponds to the data chart chart_1_2, and the identification information of the bottom layer node 1.2.2 corresponds to the data chart chart_1_3. The identification information for the bottom layer node 2.1.1 corresponds to the data chart chart_2.

In an embodiment, the node information may further include second text information of each node, and the method for generating an electronic report may further include: determining a traversal sequence based on the branch numbers and the node numbers of the respective nodes; arranging node information of the respective nodes according to the traversal sequence; and sequentially displaying the branch numbers, the node numbers, and the second text information of the respective nodes in the electronic report.

Illustratively, the second text information may include an attribute for each node. For example, in FIG. 3, the second text information of node 1 may be "urban overall population status", the second text information of node 1.1 may be "population inflow and outflow analysis", the second text information of node 1.2 may be "population age variation distribution", the second text information of node 1.2.1 may be "resident population age variation distribution", and the second text information of node 1.2.2 may be "floating population age variation distribution". The identification information of node 1.2.1 corresponds to the resident population age variation distribution chart chart_1_2, and the identification information of node 1.2.2 corresponds to the floating population age variation distribution chart chart_1_3.

Illustratively, the identification information of node 1.1.1 corresponds to two graphs, which are chart_1_0 (population inflow analysis graph) and chart_1_1 (population outflow analysis graph), respectively. The node information of node 1.1.1 may include two second text information, which are "population inflow analysis" and "population outflow analysis", respectively.

Figure 4:
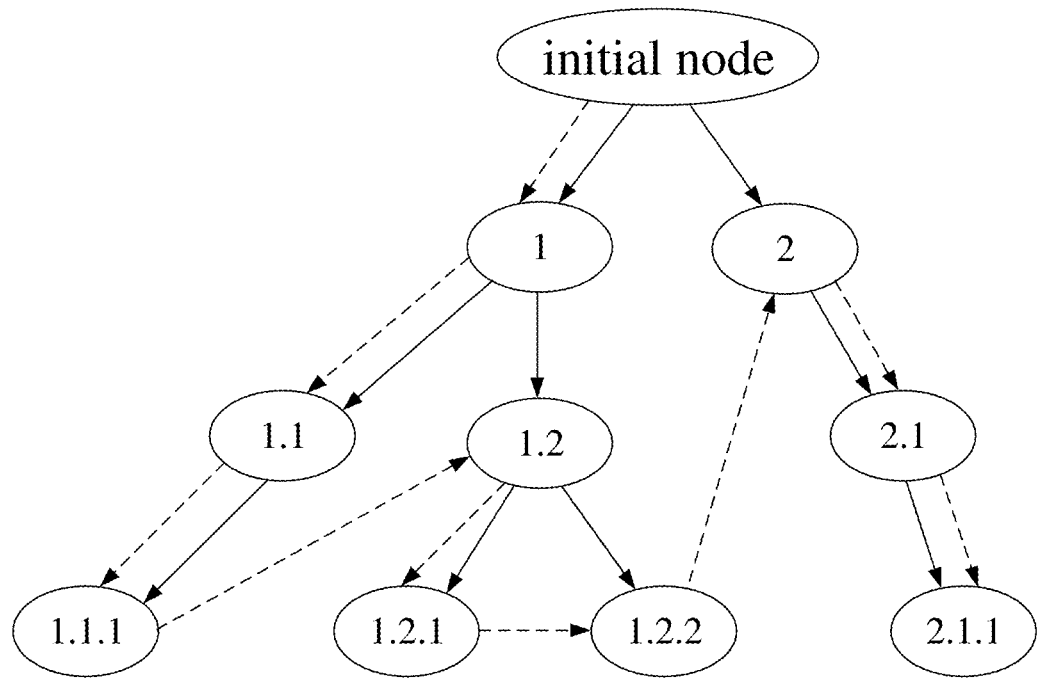
FIG. 4 is a schematic diagram of a traversal process in an embodiment of the present disclosure.

FIG. 4 is a schematic diagram of a traversal process in an embodiment of the present disclosure. In an embodiment, the traversal sequence is determined based on the branch number and the node number of each node, and the information of each node is arranged according to the traversal sequence. Specifically, the traversal can be performed based on the precedence of a template tree, the traversal process is shown as a dotted arrow in FIG. 4, and a node sequence is generated as follows: 'initial node', '1', '1.1', '1.1.1', '1.2', '1.2.1', '1.2.2', '2', '2.1', and '2.1.1'.

An electronic report is obtained according to the traversal sequence, so that the format of the electronic report can conform to the reading habit of a user, and further, the second text information can serve as the title of each node, so that the report is more visual and easy to understand, facilitating the user to view.

Figures 5, 6:
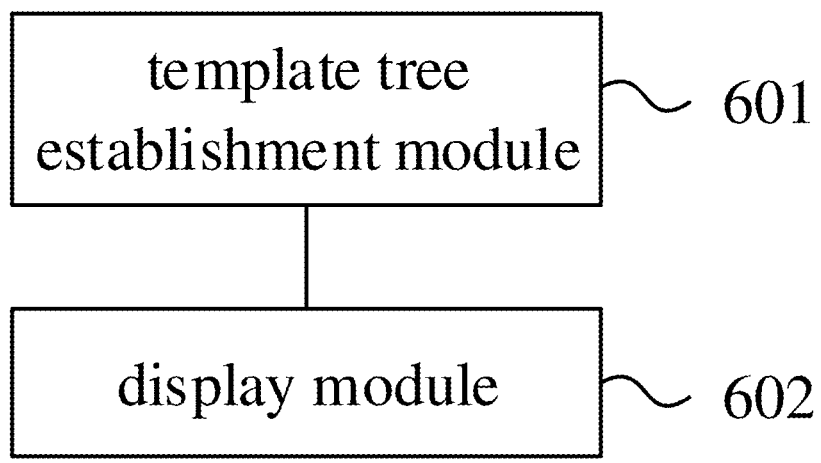
FIG. 5 is a schematic diagram of a portion of the content in an electronic report generated in an embodiment.
FIG. 6 is a structure diagram of an apparatus for generating an electronic report according to an embodiment of the present disclosure.

FIG. 5 is a schematic diagram of a portion of the content in an electronic report generated in an embodiment. After the node information is arranged, the branch number, the node number and the second text information of each node are sequentially displayed in the electronic report. As shown in FIG. 5, branch numbers, node numbers and second text information are sequentially displayed in each node.

Also, in the position where the electronic report corresponds to the bottom layer node 1.1.1, for example, page Y of the electronic report displays a population inflow analysis chart chart_1_0 and a population outflow analysis chart chart_1_1. In the location where the electronic report corresponds to the bottom layer node 1.2.1, for example, page M of the electronic report displays a resident population age variation distribution chart_1_2. In the position where the electronic report corresponds to the bottom layer node 1.2.2, for example, page P of the electronic report displays a floating population age variation distribution chart_1_3. In the position where the electronic report corresponds to the bottom layer node 2.1.1, for example, page N of the electronic report displays a chart chart_2 corresponding to the bottom layer node 2.1.1.

Illustratively, the corresponding data chart may be displayed directly after the second text information. For example, in FIG. 5, a chart chart_1_0 corresponding to the identification information of the node 1.1.1 may be displayed directly after the "population inflow analysis", and a chart chart_1_1 corresponding to the identification information of the node 1.1.1 may be displayed directly after the "population outflow analysis", a chart chart_1_2 corresponding to the identification information of the node 1.2.1 may be displayed directly after the "resident population age variation distribution", and a chart chart_1_3 corresponding to the identification information of the node 1.2.2 may be displayed directly after the "floating population age variation distribution".

FIG. 6 is a structure diagram of an apparatus for generating an electronic report in an embodiment of the present disclosure. The apparatus for generating an electronic report may include:
- a template tree establishment module 601 establishing a template tree including a plurality of branches, wherein the branches include at least one intermediate node and bottom layer nodes including identification information; and
- a display module 602 configured for calling, for respective branches, data groups corresponding to the identification information of the bottom layer nodes from a database, respectively, and displaying the called data groups at positions corresponding to the bottom layer nodes in an electronic report.

Figure 7:
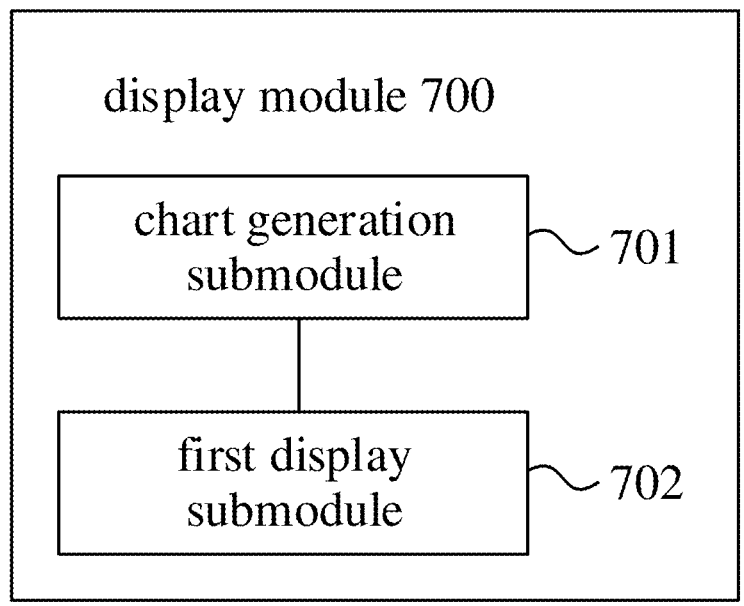
FIG. 7 is a structure diagram of a display module in an embodiment of the present disclosure.

In an embodiment, as shown in FIG. 7, the display module 700 may include: a chart generation submodule 701 configured for generating data charts corresponding to the called data groups according to a chart generation rule; and a first display submodule 702 configured for displaying the data charts.

Here, the display module 700 may be the same or similar module as the display module 602.

In an embodiment, the called data groups may include first text information, a plurality of data items, and categories of respective data items.

Figure 8:
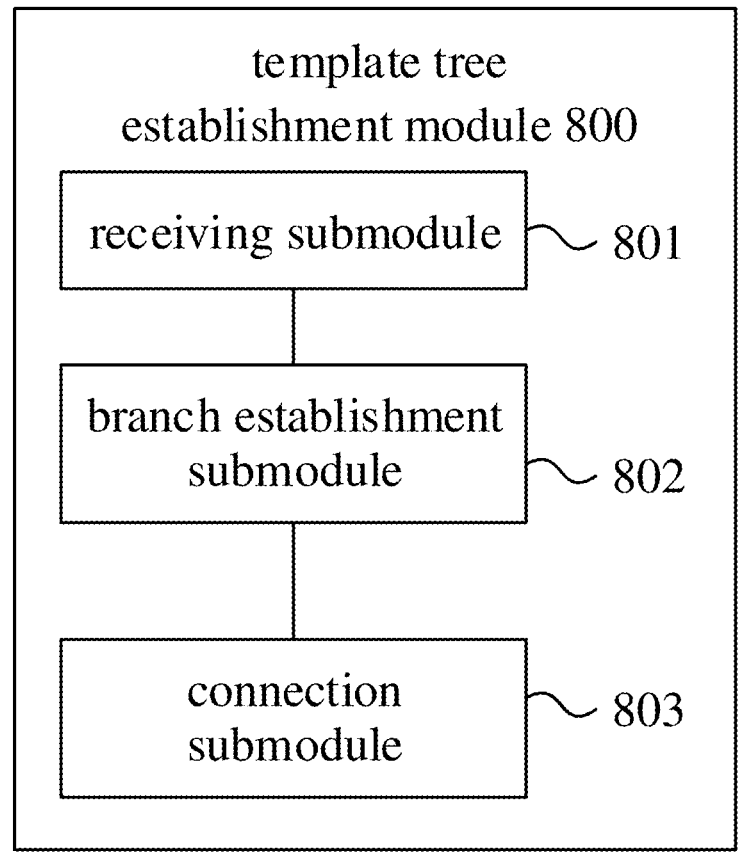
FIG. 8 is a structure diagram of a template tree establishment module in an embodiment of the present disclosure.

In an embodiment, as shown in FIG. 8, the template tree establishment module 800 may include: a receiving submodule 801 configured for receiving node information, wherein the node information comprises branch numbers and node numbers of respective nodes, and the nodes comprise the intermediate node and the bottom layer nodes; a branch establishment submodule 802 configured for establishing the respective branches, wherein nodes with a same branch number are set in a same branch; and a connection submodule 803 configured for sequentially arranging, for the respective branches, the respective nodes according to the node numbers, and connecting adjacent nodes with a connecting line.

Here, the template tree establishment module 800 may be the same or similar module as the template tree establishment module 601.

Figure 9:
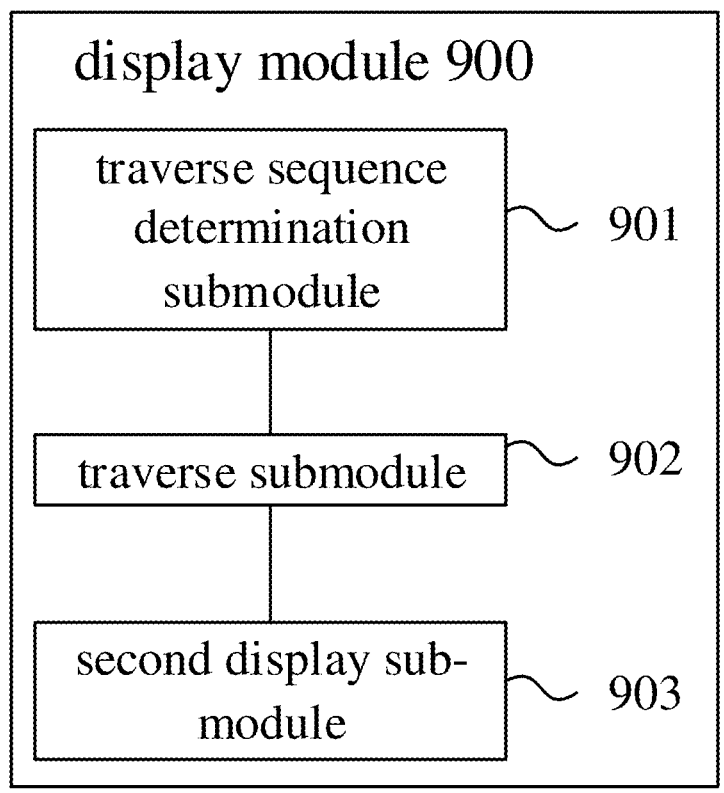
FIG. 9 is a structure diagram of another display module in an embodiment of the present disclosure.

In an embodiment, the node information may further include second text information of each node, and as shown in FIG. 9, the display module 900 may further include: a traversal sequence determination submodule 901 configured for determining a traversal sequence based on the branch numbers and the node numbers of the respective nodes; a traversal submodule 902 configured for arranging node information of the respective nodes according to the traversal sequence; and a second display submodule 903 configured for sequentially displaying the branch numbers, the node numbers, and the second text information of the respective nodes in the electronic report.

Here, the display module 900 may be the same or similar module as the display module 602.

In an embodiment, the identification information may include at least one of an attribute, a region identification, and time information.

In an embodiment, the chart generation rule may include at least one of a data comparison rule, chart type information, chart style information, and a text generation rule.

Figure 10:
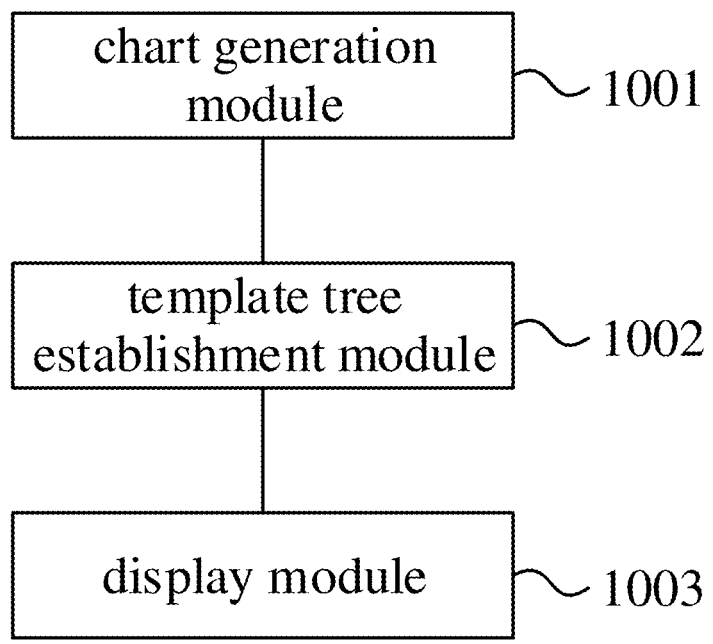
FIG. 10 is a structure diagram of an apparatus for generating an electronic report in another embodiment of the present disclosure.

In an embodiment, as shown in FIG. 10, the apparatus may further include: a chart generation module 1001, a template tree establishment module 1002, and a display module 1003. The chart generation module 1001 may be configured for generating data charts corresponding to respective data groups in the database according to a chart generation rule; further, the display module 1003 may be configured for calling, for respective branches, data charts of the data groups corresponding to the identification information of the bottom layer nodes from the database, respectively, and displaying the called data charts at the positions corresponding to the bottom layer nodes in the electronic report.

Here, the template tree establishment module 1002 may be the same or similar module as the template tree establishment module 601.

According to an embodiment of the present disclosure, the present disclosure also provides a computer program product including computer instructions which, when executed by a processor, implement the method of generating an electronic report as in the above embodiments.

In accordance with embodiments of the present disclosure, the present disclosure also provides an electronic device and a readable storage medium.

Figure 11:
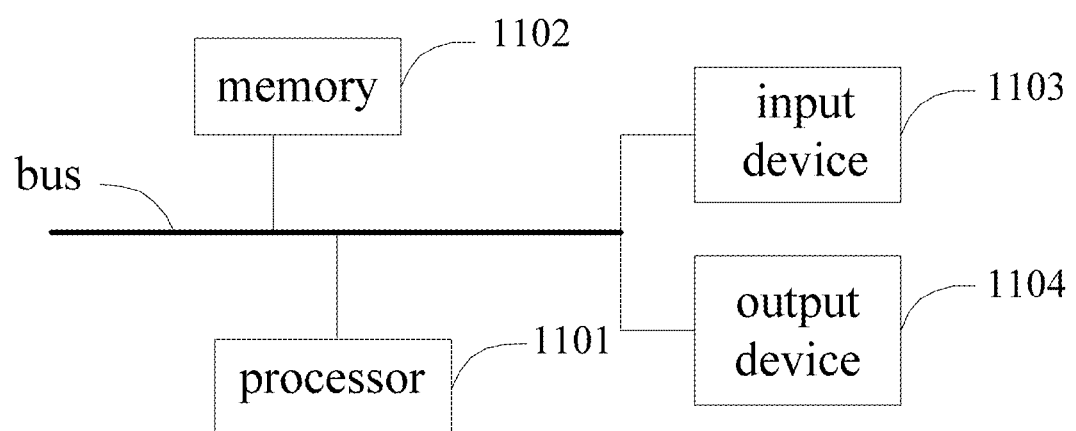
FIG. 11 is a block diagram of an electronic device used to implement a method for generating an electronic report according to an embodiment of the present disclosure.

FIG. 11 is a structure diagram of an electronic device for a method for generating an electronic report according to an embodiment of the present disclosure. The electronic device is intended to represent various forms of digital computers, such as laptop computers, desktop computers, workstations, personal digital assistants, servers, blade servers, mainframe computers, and other suitable computers. The electronic device 1400 may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the present disclosure described and/or claimed herein.

As shown in FIG. 11, the electronic device may include one or more processors 1101, a memory 1102, and interfaces for connecting the respective components, including high-speed interfaces and low-speed interfaces. The respective components are interconnected by different buses and may be mounted on a common main-board or otherwise as desired. The processor may process instructions executed within the electronic device, including instructions stored in or on the memory to display graphical information of a graphical user interface (GUI) on an external input/output device, such as a display device coupled to the interface. In other implementations, a plurality of processors and/or buses may be used with a plurality of memories, if necessary. Also, a plurality of electronic devices may be connected, each providing some of the necessary operations (e.g., as an array of servers, a set of blade servers, or a multiprocessor system). An example of a processor 1101 is shown in FIG. 11.

The memory 1102 is a non-transitory computer-readable storage medium provided herein. The memory stores instructions executable by at least one processor to enable the at least one processor to implement the method for generating an electronic report provided herein. The non-transitory computer-readable storage medium of the present disclosure stores computer instructions for enabling a computer to implement the method for generating an electronic report provided herein.

The memory 1102, as a non-transitory computer-readable storage medium, may be configured to store non-transitory software programs, non-transitory computer-executable programs, and modules, such as program instructions/modules corresponding to the method for generating an electronic report in the embodiments of the present disclosure. The processor 1101 executes various functional applications and data processing of the electronic device by running the non-transitory software programs, instructions and modules stored in the memory 1102, that is, implements the method for generating an electronic report in the method embodiments described above.

The memory 1102 may include a program storage area and a data storage area, wherein the program storage area may store an operating system, and an application program required for at least one function; and the data storage area may store data created according to the use of the electronic device for the method for generating an electronic report, etc. In addition, the memory 1102 may include a high speed random access memory, and may also include a non-transitory memory, such as at least one disk storage device, a flash memory device, or other non-transitory solid state memory device. In some embodiments, the memory 1102 may optionally include a memory remotely located with respect to the processor 1101, which may be connected, via a network, to the electronic device for the method for generating an electronic report. Examples of such networks may include, but are not limited to, the Internet, an intranet, a local area network, a mobile communication network and combinations thereof.

The electronic device for the method for generating an electronic report may further include an input device 1103 and an output device 1104. The processor 1101, the memory 1102, the input device 1103, and the output device 1104 may be connected by a bus or other means, exemplified by a bus connection in FIG. 11.

The input device 1103 may receive input numeric or character information, and generate a key signal input related to a user setting and a functional control of the electronic device for the method for generating an electronic report. For example, the input device may be a touch screen, a keypad, a mouse, a track pad, a touch pad, a pointer stick, one or more mouse buttons, a track ball, a joystick, and other input devices. The output device 1104 may include a display device, an auxiliary lighting device (e.g., a light emitting diode (LED)), a tactile feedback device (e.g., a vibrating motor), etc. The display device may include, but is not limited to, a liquid crystal display (LCD), an LED display, and a plasma display. In some embodiments, the display device may be a touch screen.

Various implementations of the systems and techniques described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

These computing programs (also referred to as programs, software, software applications, or codes) may include machine instructions of a programmable processor, and may be implemented using high-level procedural and/or object-oriented programming languages, and/or assembly/machine languages. As used herein, the terms "machine-readable medium" and "computer-readable medium" may refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

In order to provide an interaction with a user, the system and technology described here may be implemented on a computer having: a display device (e.g., a cathode ray tube (CRT) or a liquid crystal display (LCD) monitor) for displaying information to the user; and a keyboard and a pointing device (e.g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

The computer system may include a client and a server. The client and the server are typically remote from each other and typically interact via the communication network. The relationship of the client and the server is generated by computer programs running on respective computers and having a client-server relationship with each other. The server may be a cloud server, also called a cloud computing server or a cloud host, is a host product in a cloud computing service system, and solves the defects of high management difficulty and weak business expansibility in the traditional physical host and virtual private server (VPS) service. The server may also be a server of a distributed system, or a server incorporating a blockchain.

It should be understood that the steps can be reordered, added or deleted using the various flows illustrated above. For example, the steps described in the present disclosure may be performed concurrently, sequentially or in a different order, so long as the desired results of the technical solutions disclosed in the present disclosure can be achieved, and there is no limitation herein.

The above-described specific embodiments do not limit the scope of the present disclosure. It will be apparent to those skilled in the art that various modifications, combinations, sub-combinations and substitutions are possible, depending on design requirements and other factors. Any modifications, equivalent substitutions, and improvements within the spirit and principles of the present disclosure are intended to be included within the scope of the present disclosure.

What is claimed is:

1. A method for generating an electronic report, comprising:
   establishing a template tree comprising a plurality of branches, wherein the branches comprise bottom layer nodes and at least one intermediate node and the bottom layer nodes comprise identification information; and
   calling, for respective branches, data groups corresponding to the identification information of the bottom layer nodes from a database, respectively, and displaying the called data groups at positions corresponding to the bottom layer nodes in an electronic report,
   wherein the method further comprises:
   generating data charts corresponding to respective data groups in the database according to a chart generation rule; and
   wherein the calling, for respective branches, data groups corresponding to the identification information of the bottom layer nodes from the database, respectively, and the displaying the called data groups at the positions corresponding to the bottom layer nodes in the electronic report, comprises:
   calling, for respective branches, data charts of the data groups corresponding to the identification information of the bottom layer nodes from the database, respectively, and displaying the called data charts at the positions corresponding to the bottom layer nodes in the electronic report.

2. The method of claim 1, wherein the displaying the called data groups comprises:
   generating data charts corresponding to the called data groups according to the chart generation rule; and
   displaying the data charts.

3. The method of claim 1, wherein the called data groups comprise first text information, a plurality of data items, and categories of respective data items.

4. The method of claim 1, wherein the establishing the template tree comprises:
   receiving node information, wherein the node information comprises branch numbers and node numbers of respective nodes, and the nodes comprise the intermediate node and the bottom layer nodes;
   establishing the respective branches, wherein nodes with a same branch number are set in a same branch; and
   sequentially arranging, for the respective branches, the respective nodes according to the node numbers, and connecting adjacent nodes with a connecting line.

5. The method of claim 4, wherein the node information further comprises second text information of the respective nodes, and the method further comprises:
   determining a traversal sequence based on the branch numbers and the node numbers of the respective nodes;
   arranging node information of the respective nodes according to the traversal sequence; and
   sequentially displaying the branch numbers, the node numbers, and the second text information of the respective nodes in the electronic report.

6. The method of claim 1, wherein the identification information comprises at least one of:
   an attribute, a region identification, or time information.

7. The method of claim 1, wherein the chart generation rule comprises at least one of:
   a data comparison rule, chart type information, chart style information, or a text generation rule.

8. An electronic device, comprising:
   at least one processor; and a memory communicatively connected to the at least one processor, wherein the memory stores instructions executable by the at least one processor, the instructions being executed by the at least one processor to enable the at least one processor to perform operations of:

establishing a template tree comprising a plurality of branches, wherein the branches comprise bottom layer nodes and at least one intermediate node and the bottom layer nodes comprise identification information; and calling, for respective branches, data groups corresponding to the identification information of the bottom layer nodes from a database, respectively, and displaying the called data groups at positions corresponding to the bottom layer nodes in an electronic report, wherein the instructions are executable by the at least one processor to enable the at least one processor to further perform an operation of:

generating data charts corresponding to respective data groups in the database according to a chart generation rule; and wherein the calling, for respective branches, data groups corresponding to the identification information of the bottom layer nodes from the database, respectively, and the displaying the called data groups at the positions corresponding to the bottom layer nodes in the electronic report, comprises:

calling, for respective branches, data charts of the data groups corresponding to the identification information of the bottom layer nodes from the database, respectively, and displaying the called data charts at the positions corresponding to the bottom layer nodes in the electronic report.

9. The electronic device of claim 8, wherein the displaying the called data groups comprises:

generating data charts corresponding to the called data groups according to the chart generation rule; and displaying the data charts.

10. The electronic device of claim 8, wherein the called data groups comprise first text information, a plurality of data items, and categories of respective data items.

11. The electronic device of claim 8, wherein the establishing the template tree comprises:

receiving node information, wherein the node information comprises branch numbers and node numbers of respective nodes, and the nodes comprise the intermediate node and the bottom layer nodes;

establishing the respective branches, wherein nodes with a same branch number are set in a same branch; and sequentially arranging, for the respective branches, the respective nodes according to the node numbers, and connecting adjacent nodes with a connecting line.

12. The electronic device of claim 11, wherein the node information further comprises second text information of the respective nodes, and wherein the instructions are executable by the at least one processor to enable the at least one processor to further perform operations of:

determining a traversal sequence based on the branch numbers and the node numbers of the respective nodes;

arranging node information of the respective nodes according to the traversal sequence; and sequentially displaying the branch numbers, the node numbers, and the second text information of the respective nodes in the electronic report.

13. The electronic device of claim 8, wherein the identification information comprises at least one of:

an attribute, a region identification, or time information.

14. The electronic device of claim 9, wherein the chart generation rule comprises at least one of:

a data comparison rule, chart type information, chart style information, or a text generation rule.

15. A non-transitory computer-readable storage medium storing computer instructions for enabling a computer to execute operations of:

establishing a template tree comprising a plurality of branches, wherein the branches comprise bottom layer nodes and at least one intermediate node and the bottom layer nodes comprise identification information; and calling, for respective branches, data groups corresponding to the identification information of the bottom layer nodes from a database, respectively, and displaying the called data groups at positions corresponding to the bottom layer nodes in an electronic report, wherein the computer instructions are executable by the computer to enable the computer to further perform an operation of:

generating data charts corresponding to respective data groups in the database according to a chart generation rule; and wherein the calling, for respective branches, data groups corresponding to the identification information of the bottom layer nodes from the database, respectively, and the displaying the called data groups at the positions corresponding to the bottom layer nodes in the electronic report, comprises:

calling, for respective branches, data charts of the data groups corresponding to the identification information of the bottom layer nodes from the database, respectively, and displaying the called data charts at the positions corresponding to the bottom layer nodes in the electronic report.

16. The non-transitory computer-readable storage medium of claim 15, wherein the displaying the called data groups comprises:

generating data charts corresponding to the called data groups according to the chart generation rule; and displaying the data charts.

17. The non-transitory computer-readable storage medium of claim 15, wherein the called data groups comprise first text information, a plurality of data items, and categories of respective data items.

18. The non-transitory computer-readable storage medium of claim 15, wherein the establishing the template tree comprises:

receiving node information, wherein the node information comprises branch numbers and node numbers of respective nodes, and the nodes comprise the intermediate node and the bottom layer nodes;

establishing the respective branches, wherein nodes with a same branch number are set in a same branch; and sequentially arranging, for the respective branches, the respective nodes according to the node numbers, and connecting adjacent nodes with a connecting line.

* * * * *

UNITED STATES PATENT AND TRADEMARK OFFICE
CERTIFICATE OF CORRECTION

PATENT NO. : 11,657,550 B2  
APPLICATION NO. : 17/450650  
DATED : May 23, 2023  
INVENTOR(S) : Yanyan Li et al.

Page 1 of 1

It is certified that error appears in the above-identified patent and that said Letters Patent is hereby corrected as shown below:

On the Title Page

(73) Assignee:  
Delete "BEIJING BAIDU NETCOM SCIENCE AND TECHNOLOGY CO., LTD."  
Insert: --BEIJING BAIDU NETCOM SCIENCE TECHNOLOGY CO., LTD.--

Signed and Sealed this  
Twenty-fifth Day of July, 2023

Katherine Kelly Vidal  
*Director of the United States Patent and Trademark Office*